United States Patent
Heeks et al.

(10) Patent No.: US 6,726,399 B2
(45) Date of Patent: Apr. 27, 2004

(54) VALVE ARRANGEMENT AND TRAFFIC CALMING DEVICE INCORPORATING SUCH AN ARRANGEMENT

(75) Inventors: Graham Heeks, Cheshire (GB); Nigel Peter Fox, Staffordshire (GB)

(73) Assignee: Autospan Limited, Manchester (GB)

( * ) Notice: Subject to any disclaimer, the term of this patent is extended or adjusted under 35 U.S.C. 154(b) by 0 days.

(21) Appl. No.: 10/204,895

(22) PCT Filed: Feb. 26, 2001

(86) PCT No.: PCT/GB01/00796
§ 371 (c)(1),
(2), (4) Date: Nov. 26, 2002

(87) PCT Pub. No.: WO01/63051
PCT Pub. Date: Aug. 30, 2001

(65) Prior Publication Data
US 2003/0143023 A1 Jul. 31, 2003

Related U.S. Application Data

(63) Continuation-in-part of application No. 09/180,621, filed on Jan. 8, 1999, now abandoned.

(30) Foreign Application Priority Data
Feb. 25, 2000 (GB) .............................................. 0004360

(51) Int. Cl.$^7$ ................................................ E01F 11/00
(52) U.S. Cl. ...................................................... 404/15
(58) Field of Search ............................. 404/9, 10, 15; 116/63 R

(56) References Cited

U.S. PATENT DOCUMENTS

| | | | | |
|---|---|---|---|---|
| 3,720,181 A | * | 3/1973 | Elkins ........................ 116/63 P |
| 4,203,685 A | | 5/1980 | Sanchez ........................ 404/6 |
| 4,362,424 A | | 12/1982 | Barber .......................... 404/6 |
| 4,367,975 A | | 1/1983 | Tyers ............................ 404/6 |
| 4,534,673 A | | 8/1985 | May ............................. 404/16 |
| 5,415,493 A | | 5/1995 | Eaton ............................ 404/15 |
| 5,419,652 A | | 5/1995 | Flanders ........................ 404/15 |
| 6,010,277 A | | 1/2000 | Follman ........................ 404/11 |
| 6,024,510 A | | 2/2000 | Kamienchick ................. 404/15 |
| 6,241,419 B1 | * | 6/2001 | Bond ............................ 404/10 |
| 6,276,667 B1 | | 8/2001 | Arthur ........................ 256/13.1 |
| 2002/0085881 A1 | * | 7/2002 | Heeks ........................... 404/15 |
| 2003/0053860 A1 | * | 3/2003 | Hall ............................. 404/15 |

FOREIGN PATENT DOCUMENTS

| | | |
|---|---|---|
| DE | 29 14 708 | 10/1980 |
| DE | 3 447 712 A1 | 8/1986 |
| EP | 0 370 154 A1 | 5/1990 |
| FR | 2 622 034 | 4/1989 |
| FR | 2 699 567 | 6/1994 |
| GB | 2 266 552 A | 11/1993 |
| GB | 2 288 419 A | 10/1995 |
| GB | 2 324 326 | 10/1998 |
| GB | 2 328 235 A | 2/1999 |
| GB | 2 336 867 | * 3/1999 |
| WO | WO 93/24707 | 12/1993 |
| WO | 97/46760 | * 12/1997 |
| WO | WO 98/40563 | 9/1998 |
| WO | WO 91/63051 | 8/2001 |

OTHER PUBLICATIONS

U.S. patent application Ser. No. 09/990,409, filed Nov. 21, 2001.

* cited by examiner

Primary Examiner—Gary S. Hartmann
(74) Attorney, Agent, or Firm—Woodcock Washburn LLP

(57) ABSTRACT

A reactive speed hump (2) includes a fluid flow control valve assembly (4). A first valve (18, 20, 21) is naturally open and a second valve (10, 14, 15, 16, 17), naturally closed. Application of fluid pressure on the control valve assembly below a first lower threshold level or above a second higher threshold level allows a flow of fluid from the inlet to the outlet, but an application of fluid pressure on the control valve between said first and second threshold levels allows substantially no fluid to flow between the inlet (7) and the outlet (9).

8 Claims, 1 Drawing Sheet

VALVE ARRANGEMENT AND TRAFFIC CALMING DEVICE INCORPORATING SUCH AN ARRANGEMENT

This invention relates to valves and especially, but not exclusively, to valves for use in reactive traffic calming humps, and to a traffic calming device incorporating such a valve arrangement. This application as it applies to the designated state U.S. is a continuation-in-part of application Ser. No. 09/180,621 filed Jan. 8, 1999 now abandoned (corresponding to PCT/GB98/00748) entitled Deformable Speed Hump, the contents of which are hereby incorporated by reference.

Hitherto, traffic calming humps (which are often colloquially referred to as "sleeping policemen") have conventionally comprised rigid structures laid across the road where calming is required. Typically, the humps are made, in situ, of tarmac and are integrated into the road surface. Alternatively, although less often, they comprise pre-fabricated structures made of, for example, steel which are secured to the road by suitable fasteners. In any event, these conventional humps have disadvantages. For example, they may present no less discomfort to occupants of a vehicle travelling at an acceptably low speed (say up to 30 mph) than to those of one travelling at an excessive speed. Also, they are potentially hazardous to vehicles such as ambulances and fire engines which, in the case of an emergency, might be travelling at a relatively high speed.

In order to overcome or mitigate those disadvantages, the use of "reactive" traffic calming humps has been proposed. One type of reactive hump, with which the present invention is especially concerned, is disclosed in UK patent application GB-A-2324326 and corresponding PCT application No WO 98/40563 and comprises a pre-fabricated enclosure containing air and including a resiliently flexible, upper, hump-shaped membrane. It operates on the principle that when, on the one hand, the wheels of, for example, a car contact the membrane at a relatively low speed, the enclosure will progressively deflate under the weight of the car thereby causing little discomfort to the occupant(s). On the other hand, at excessive speeds, deflation is substantially prevented and the membrane maintains its hump-shaped form, thereby jolting the occupant(s) and inducing the driver to slow down prior to reaching the next hump. Further, the hump should preferably provide a relatively smooth passage for emergency vehicles, particularly ambulances, regardless of their speed of travel. The means hitherto proposed to control deflation of such type of reactive hump have not been entirely satisfactory. It is an object of the invention to provide valve means adapted especially, but not exclusively, for permitting or substantially preventing, as the case may be, deflation and collapse of a reactive traffic calming hump of the type described above.

According to a first aspect of the present invention, there is provided a reactive traffic calming device comprising a resiliently deformable enclosure containing air, air within the enclosure communicating with the atmosphere via a valve arrangement permitting the enclosure to be deflated under the weight of a passing vehicle and to re-inflate after passage of the vehicle, said valve arrangement comprising a pressure-sensitive valve adapted to remain open while the air within the enclosure is up to a first pressure threshold, thereby permitting deflation, and to close in response to pressure above said first pressure threshold, thereby preventing deflation in response to excessive vehicle speed.

The pressure-sensitive valve may comprise a first valve closure biased into a normally-open position and movable to a closed position, the air pressure within the enclosure impinging on said first valve closure to overcome said biasing means above said first pressure threshold.

The first valve closure may for example comprise a member having a shaft portion mounted to slide within a bore, and a broader, head portion responding directly to the air pressure. The biasing means may in this case comprise a coil spring surrounding the shaft portion and acting against the head portion.

The valve arrangement may further comprise means defining a sensing chamber surrounding the first valve closure, said inlet chamber communicating with the air within the enclosure via a restricted air inlet. This provision isolates the closure from transient air movements within the enclosure, promoting a more reliable response and avoiding spurious and intermittent actuation of the valve.

The restricted inlet may be arranged so as to direct air in a jet directly at the closure member. This feature may provide a more positive actuation of the valve.

The valve arrangement may further comprise a second valve, normally closed, arranged so as to open and allow rapid deflation of the device in response to pressure exceeding a second pressure threshold, greater than the first pressure threshold. This behaviour permits the desirable response to emergency vehicles, which are characterised by high weight and speed.

The second valve may comprise a second valve closure movable against second biasing means from a normally closed position to an open position.

The first and second valves may be integrated in a single unit. One such embodiment provides a fluid flow control valve comprising a body defining a fluid inlet and a fluid outlet, the body housing, intermediate the fluid inlet and the fluid outlet, first and second valves, the first valve including a first valve closure movable, against a first biasing means, from a normally-open position to a closed position and the second valve including a second valve closure movable, against a second biasing means, from a normally-closed position to an open position, the arrangement being such that, upon the application at the inlet of fluid pressure below a pre-determined lower value, the first and second valves maintain their normally open and closed positions respectively whereby fluid at the inlet can exhaust through the outlet via said first valve, that upon the application at the inlet of fluid pressure at or above said pre-determined lower value, but below a pre-determined higher value, the fluid pressure causes the first valve closure to move to its closed position while the second valve maintains its closed position whereby fluid is prevented from flowing through the control valve, and that, upon the application at the inlet of fluid pressure at or above said pre-determined higher value, the fluid pressure causes the first valve closure to move to its closed position and the second valve closure to move to its open position whereby fluid at the inlet can exhaust through the outlet via the second valve.

The embodiment described therefore provides a pressure sensitive valve that will respond in one or other of three different ways depending upon the increased fluid pressure applied to its inlet. In the context of a reactive road hump of the type described above, the valve functions as follows.

In a first case, when the wheels of a vehicle, such as a car, surmount the hump, the air in the enclosure will increase in pressure. Provided, however, that the vehicle is travelling at, or less than a pre-determined "safe" speed, the pressure increase in the enclosure, and therefore at the inlet of the control valve, will be limited and insufficient to cause the first valve to close, as air will be able to exhaust from the enclosure via the first valve and the outlet of the control valve. The flexible membrane therefore progressively collapses and the vehicle's occupant(s) will experience little or no discomfort.

In an alternative case, if the vehicle is travelling at a speed in excess of the pre-determined safe speed, the sudden pressure increase will be sufficient to cause the first valve to close, but will generally be insufficient to cause the second valve to open. Exhaust of air from the enclosure will therefore be substantially prevented and so the hump will more or less maintain its normal form and the occupant(s) will experience a discomforting jolt, thus inducing the driver to slow down.

Further, in the case of, for example, heavy emergency vehicles, the pressure increase will, more or less regardless of speed, be sufficiently high to cause the first valve to close and the second valve to open, whereupon air can exhaust from the enclosure and the flexible membrane will collapse and little or no discomfort will be experienced.

In a preferred, very compact, embodiment of a fluid flow control valve of the invention, the first valve closure comprises a generally annular member, the periphery of which co-operates with an annular seat of the first valve, and which defines a central passageway incorporating the second valve closure, the latter being operative to open or close the passageway as the case may be. Especially in that embodiment, the body is preferably generally cylindrical with the fluid inlet and fluid outlet being located at opposite ends thereof.

The biasing means may for example be compression springs, such as helical coil springs. Of course, other forms of spring may be suitable.

As will be appreciated, the reactivity of the hump may be varied as desired by varying the closing and opening characteristics of the first and second valves, as is described in more detail below. This may be by selection of the spring or other biasing means, by adjustments of geometry, or selection of parts of different geometry.

The invention further provides a valve arrangement for use in a reactive traffic calming device of the type described incorporating, first and optionally second fluid flow control valves adapted to operate as defined above. The valves may be arranged to be located separately in the wall but preferably they are integrated into a unitary body as defined by the first aspect of the invention.

BRIEF DESCRIPTION OF THE DRAWINGS

A fluid flow control valve constructed in accordance with the first aspect of the invention, and a reactive traffic calming hump incorporating it, will now be described in more detail, by way of example only, with reference to the accompanying drawings in which.

DETAILED DESCRIPTION OF THE EMBODIMENTS

Figure 1:
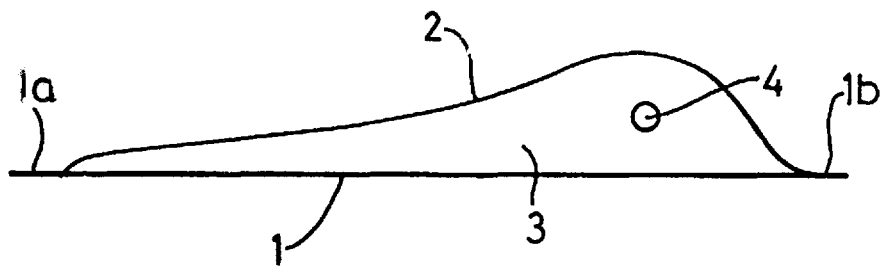
FIG. 1 is a side elevation, on a reduced scale, of the reactive traffic calming hump.

Referring first to FIG. 1, the reactive traffic calming hump, which is generally of the form shown in FIG. 6 of GB-A-2324326, includes a relatively rigid base 1 having peripheral portions 1a, 1b through which suitable fasteners (not shown) may be inserted in order to secure the hump to a road surface. A resilient, relatively flexible upper membrane 2 and opposed side walls, only one of which 3 can be seen, are secured to the base 1. The base, membrane and side walls form an enclosure containing air at atmospheric pressure. The enclosure is completely sealed but is provided with the control valve shown in FIG. 2 which is securely located in an aperture 4 formed in the side wall 3. Usually, a complete traffic calming hump will comprise a number of modules as described above arranged in side-by-side relationship across the road where calming is required.

Figure 2:
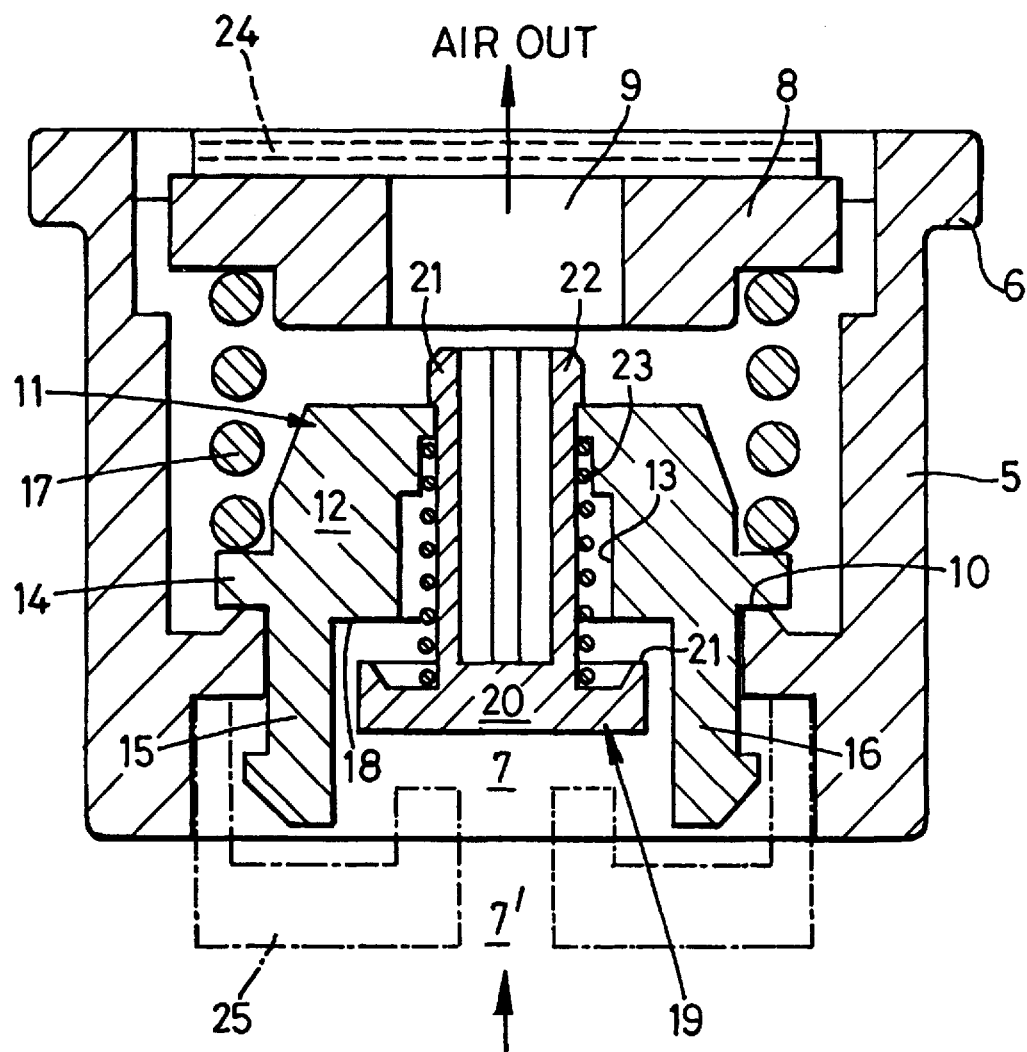
FIG. 2 is a sectional side elevation, on a scale of about 3:1, of the control valve.

Referring now to FIG. 2, the control valve comprises a generally cylindrical hollow body 5 housing various valve components as described below. The body 5, which may for example be a plastics moulding, is formed with an annular locating flange 6 which, when the control valve is in position, abuts the external surface of the side wall 3 of the hump with the body 5 extending into the interior of the hump.

The innermost end of the body 5 defines, internally of the enclosure, an air inlet 7, while a retaining disc 8 engaged with the body 5 at its outermost end, for example by means of a bayonet fixture, defines an air outlet 9. The flow of air between the inlet 7 and the outlet 9 is selectively controlled, in dependence upon the air pressure prevailing at the inlet 7, by two valves housed in the body 5. One valve ("the second valve") comprises an annular seat 10 formed integrally with the body 5 and a closure 11. The closure 11, which also may be a plastics moulding, comprises a main portion 12 having an axial, stepped bore 13 formed in it, an annular flange 14 and a plurality of spaced, radially resilient locating legs having enlarged ends, two of which are shown and designated 15 and 16. The closure 11, and more particularly the flange 14 thereof, is normally urged into sealing contact with the annular seat 10 by a relatively strong compression spring 17 sandwiched between the flange 14 and the retaining disc 8. As will be apparent, the closure 11 is located by its legs 15 and 16 etc in the body 5 as a snap fit.

The other valve ("the first valve") comprises an annular seat 18 defined by an end face of the closure 11 and which surrounds one end of the bore 13, and a closure 19. The closure 19, which likewise may be a plastics moulding, comprises a head 20 from which extend a plurality of spaced, radially resilient locating legs having enlarged ends, two of which are shown and designated 21 and 22. The closure 19 is located by its legs 21, 22 etc in the axial bore 13 as a snap fit. The head 20 defines an annular sealing face 21 which is normally urged into a position spaced from the seat 18 by means of a relatively light compression spring 23.

Normally, therefore, the second valve is in a closed position, whereas the first valve is in an open position. The two valves react in one of the following three ways when a vehicle surmounts the flexible membrane 2 of the hump.

1. If the vehicle is travelling at a relatively low, "safe", speed, the air pressure in the enclosure will tend to increase, but at such a rate that air in the enclosure will simply exhaust from the outlet 9 via the inlet 7 and the open first valve and more particularly via the bore 13 and the slotted closure 19. In other words, the pressure will not rise to a value sufficient for the force exerted on the head 20 to overcome that provided by the spring 23, whereby the first valve remains open (the second valve will, of course, remain closed). Accordingly, the membrane 2 will progressively collapse and little or no discomfort will be experienced by the vehicle's occupant(s). Once the vehicle wheels are clear of the hump, the membrane 2 will resile back to its normal, raised position, air simultaneously being drawn into the enclosure via the open, first valve.

It will be appreciated that the operation of the first valve, ie. the conditions under which it remains open or closes may be varied by varying the available cross-sectional flow area through it, the cross-sectional area of the head 20 and/or the properties of the compression spring 23. By way of example, these may be selected such that the first valve will remain open for so long as the pressure at the inlet 7 is at or below about 0.3 bar gauge.

2. If the vehicle is travelling at a higher, "unsafe", speed, there will be a sudden increase in the air pressure in the enclosure sufficient to close the first valve, the closure 19 moving axially in the bore 13, against the spring 23, until the surface 21 sealingly engages the seat 18. However, the second valve will remain closed. Accordingly, in that situation the control valve acts as a check valve and little or no exhaust of air will be possible from the enclosure. The hump will, therefore, substantially maintain its normal form and impart a discomforting jolt to the vehicle's occupant(s), thus inducing the driver to slow down. Once the vehicle wheels are clear of the hump, the first valve will revert to its normal, open, position.

3. If the vehicle is heavy (such as an emergency vehicle), there will be a sudden increase in pressure, more or less regardless of the speed of the vehicle, to such a value that not only will the first valve close as described in 2 above, but also the force exerted on the closure 11 by the fluid pressure will be sufficiently high to overcome the force exerted on it by the compression spring 17. The closure 19, and more particularly the flange 14, will therefore move out of sealing contact with the seat 10 thus allowing air in the enclosure to exhaust from the outlet 9 via the inlet 7 and the spaces between the legs 15 and 16, whereby the hump collapses as the vehicle's wheels pass over it. Subsequently, the second and first valves and the hump will resile back to their normal positions.

The pressure at which the second valve opens may be varied by altering the effective cross-sectional area of the closure 11 (ie. the area of it acted upon by the fluid) and the properties of the spring 17. As an example, these may be selected such that it will not open at a pressure below about 3 bar gauge.

In FIG. 2, the dashed lines illustrate two desirable modifications to the valve. More particularly, the valve may be protected against the ingress of foreign matter through the outlet 9 by a filter element 24 retained by the body 5. Filter element 24 may of course comprise a wire or plastic mesh. For best protection against ingress of dirt and moisture, however, the filter element in this example comprises a waterproof, air-permeable (so-called "breathable") membrane such as that sold under the trade marks SYMPATEX or GORE-TEX. The valve may be serviceable by removal of this element 24, using a tool adapted to extract the valve mechanism. Alternatively, for maximum security, the valve unit may be inaccessible except by removal of the hump from the road. According to a preferred embodiment, subject of co-pending application GB 0103501.3, the device may be mounted on a concrete slab, removable bodily from the road.

A second modification shown dotted in FIG. 2 is that and the inlet 7 may comprise a jet 7' defined by an annular member 25 secured to the body 5. The jet 7', because of its restricted diameter, serves to increase the velocity of incoming air, whereby the response of the valve is improved. The member 25 also defines a sensing chamber substantially isolated from the main interior space of the device, which protects the valve from spurious actuation, as air moves from one part of the deformable enclosure to another. This benefit can be obtained by providing a restricted inlet 7 to the sensing chamber, without necessarily creating a jet 7' directed at the head 20 of the closure.

As noted above, a valve of the invention may comprise largely plastics mouldings, but of course any other suitable materials may be used.

Further, while a control valve of the invention is especially suitable for use with reactive traffic calming humps, it may have alternative applications where valve open/check/valve open functions are required depending on the magnitude of the fluid pressure prevailing at the inlet.

What is claimed is:

1. A reactive traffic calming device comprising a resiliently deformable enclosure containing air, air within the enclosure communicating with the atmosphere via a valve arrangement permitting the enclosure to be deflated under the weight of a passing vehicle and to re-inflate after passage of the vehicle, said valve arrangement comprising a pressure-sensitive valve adapted to remain open while the air within the enclosure is up to a first pressure threshold, thereby permitting deflation, and to close in response to pressure above said first pressure threshold, thereby preventing deflation in response to excessive vehicle speed.

2. A reactive traffic calming device as claimed in claim 1 wherein the pressure-sensitive valve comprises a first valve closure biased into a normally-open position and movable to a closed position, the air pressure within the enclosure impinging on said first valve closure to overcome said biasing means above said first pressure threshold.

3. A reactive traffic calming device as claimed in claim 2 wherein the first valve closure comprises a member having a shaft portion mounted to slide within a bore, and a broader, head portion responding directly to the air pressure.

4. A reactive traffic calming device as claimed in claim 3 wherein the biasing means comprise a coil spring surrounding the shaft portion and acting against the head portion.

5. A reactive traffic calming device as claimed in claims 2, 3, or 4 wherein the valve arrangement comprises means defining a sensing chamber surrounding the first valve closure, said inlet chamber communicating with the air within the enclosure via a restricted air inlet.

6. A reactive traffic calming device as claimed in claim 5 wherein the restricted inlet may be arranged so as to direct air in a jet directly at the closure member.

7. A reactive traffic calming device as claimed in claims 1, 2, 3, or 4 wherein the valve arrangement may further comprise a second valve, normally closed, arranged so as to open and allow rapid deflation of the device in response to pressure exceeding a second pressure threshold, greater than the first pressure threshold.

8. A reactive traffic calming device as claimed in claim 7 wherein the second valve may comprise a second valve closure movable, against second biasing means from a normally closed position to an open position.

* * * * *